W. G. LERCH.
REED.
APPLICATION FILED JULY 19, 1918.

1,313,705. Patented Aug. 19, 1919.

Inventor.
William G. Lerch,
by Spear Middleton Donaldson & Spear
Attys.

UNITED STATES PATENT OFFICE.

WILLIAM G. LERCH, OF AKRON, OHIO, ASSIGNOR TO MILLER RUBBER COMPANY, OF AKRON, OHIO, A CORPORATION OF OHIO.

REED.

1,313,705. Specification of Letters Patent. Patented Aug. 19, 1919.

Application filed July 19, 1918. Serial No. 245,717.

*To all whom it may concern:*

Be it known that I, WILLIAM G. LERCH, a citizen of the United States, residing at Akron, Ohio, have invented certain new and useful Improvements in Reeds, of which the following is a specification.

My present invention relates to improvements in reeds and is designed more especially for use in horns, toy balloons of the type known as squawkers, etc.

The invention aims to provide a construction which may be readily and cheaply manufactured and the parts readily assembled by unskilled labor.

It has heretofore been proposed to utilize rubber as the vibrating portion of the reed, but in all cases of which I am aware it has been necessary in assembling the vibrating portion and spool to make frequent adjustments with intervening tests until the rubber is stretched to a sound producing tension, and the labor required for this has run the cost so high as to be practically prohibitive.

By my invention the parts are so constructed that the mere assembling thereof in the first instance necessarily results in the proper tension of the vibrating portion.

The invention includes the novel features of construction and arrangement and combination of parts hereinafter described and particularly defined by the appended claim.

An embodiment of my invention is illustrated in the accompanying drawing, in which.

Figure 1:
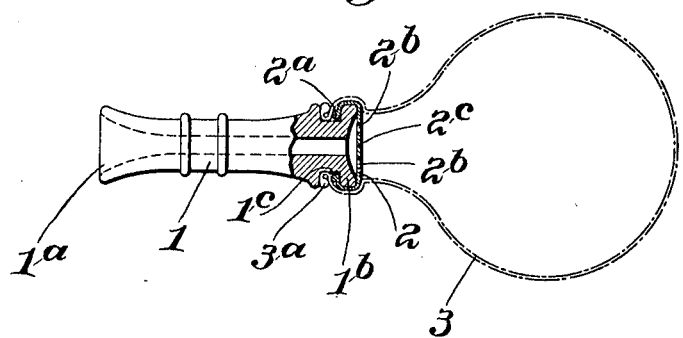
Figure 1 is a longitudinal sectional view through the reed as embodied in a "squawker" balloon.
Figure 2:
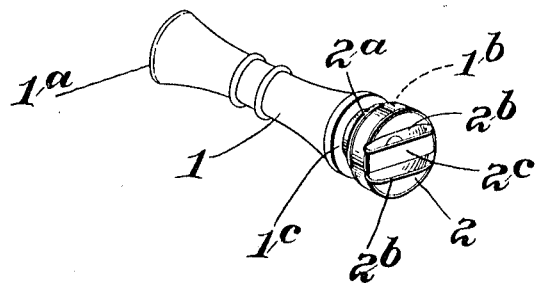
Fig. 2 is a perspective view.

Referring by reference characters to this drawing the numeral 1 designates a tube or spool of any suitable construction and material, preferably wood with one end $1^a$ conveniently shaped for placement between the lips. The other end is provided with an annular bead or rib $1^b$ which is preferably formed by an annular groove $1^c$ just back of the end of the spool. 2 designates a rubber cap which is molded with a beaded edge $2^a$ and the head of the cap is provided with two parallel slits $2^b$ leaving an intervening strip $2^c$ which constitutes the vibrating portion.

The cap is applied to the spool by stretching it until the bead on the edge of the cap slips over and rests behind the annular bead or rib on the spool and the parts are so proportioned that when in such position the strip $2^c$ will be under the tension requisite to cause it to emit sounds due to its vibration under the action of the air passing through the spool.

The same groove which forms the bead on the spool and receives the headed edge of the cap may be utilized to receive the beaded edge $3^a$ of the balloon or horn bulb 3.

Having thus described my invention what I claim is:—

In combination, a tube having an abrupt shoulder spaced apart from its end and a substantially cup-shaped thin rubber member normally of less diameter than the end of said tube and of less depth than the distance between the end wall of the tube and the shoulder, the end wall of said member being provided with spaced apart slits extending in parallel relation across the central portion of the same and the edge of the open end of the member being provided with a bead adapted by stretching the cup shaped member to be forced behind said shoulder, whereby the end of the member is stretched and held permanently in stretched condition so that the slits in the end thereof are opened and the intact part of the wall between the slits are placed under the tension requisite to cause it to emit sound due to its vibration under the action of air forced through the tube.

In testimony whereof, I affix my signature.

WILLIAM G. LERCH.

Copies of this patent may be obtained for five cents each, by addressing the "Commissioner of Patents, Washington, D. C."